(12) United States Patent
Hermann et al.

(10) Patent No.: US 7,399,025 B2
(45) Date of Patent: Jul. 15, 2008

(54) WIND DEFLECTOR FOR A MOTOR VEHICLE AND MOTOR VEHICLE HAVING SUCH A WIND DEFLECTOR

(75) Inventors: Felix Hermann, Leonberg (DE); Dominik Beierl, Korntal-Muenchingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/828,054

(22) Filed: Jul. 25, 2007

(65) Prior Publication Data

US 2008/0023984 A1 Jan. 31, 2008

(30) Foreign Application Priority Data

Jul. 26, 2006 (DE) ........................ 10 2006 034 445

(51) Int. Cl.
*B60J 1/20* (2006.01)
(52) U.S. Cl. .................................. 296/180.2; 296/180.1
(58) Field of Classification Search .... 296/180.1–180.5
See application file for complete search history.

(56) References Cited

U.S. PATENT DOCUMENTS

| 6,030,027 | A | 2/2000 | Graf | |
| 6,554,349 | B2 * | 4/2003 | Gloss | 296/180.1 |
| 6,582,008 | B2 * | 6/2003 | Maeurle et al. | 296/180.1 |
| 6,926,062 | B2 * | 8/2005 | Neumann et al. | 296/180.1 |

FOREIGN PATENT DOCUMENTS

DE 197 25 217 C1 7/1998

* cited by examiner

*Primary Examiner*—Lori L Lyjak
(74) *Attorney, Agent, or Firm*—Crowell & Moring LLP (57) ABSTRACT

A motor vehicle wind deflector contains a stretching bow mounted to be pivotable around a first fixed pivot axis running transversely to the vehicle. A flexible flat structure which is rollable onto and unrollable from a rolling axis parallel to stretching bow axis is attached to the stretching bow to which a roof arch is also connected. The roof arch is mounted to be pivotable around a second fixed pivot axis extending transversely to the vehicle, which second axis is spaced in the longitudinal direction of the vehicle from the first pivot axis. The stretching bow is connected via a movable coupling mechanism to the roof arch.

20 Claims, 9 Drawing Sheets

WIND DEFLECTOR FOR A MOTOR VEHICLE AND MOTOR VEHICLE HAVING SUCH A WIND DEFLECTOR

RELATED APPLICATIONS

This application claims priority to German patent application serial number DE 10 2006 034 445.6, filed Jul. 26, 2006, the disclosure of which is incorporated herein in its entirety.

BACKGROUND AND SUMMARY OF THE INVENTION

The present invention relates to a wind deflector for motor vehicle and a motor vehicle having such a wind deflector.

DE 197 25 217 C1 discloses a wind deflector and a motor vehicle using same. In the known wind deflector, a deflection support is articulatingly attached to a stretching bow. The deflection support has a transverse element that is used as the deflector for a flexible rollable and unrollable flat structure and is displaced horizontally using a type of scissor joint to roll and unroll the flat structure. A rolling axis, onto which the flat structure is rollable and from which it is unrollable, is attached fixed in place on the motor vehicle at the rear. Such a scissor joint is complex to implement and requires a relatively large amount of space.

An object of the present invention is to provide a wind deflector that may be implemented in a technically simple and reliable way into an active position, in which it is used for wind protection, and a neutral position, in which it is not used for wind protection.

This object has achieved by a wind deflector in which the roof arch is mounted so it is pivotable around a pivot axis extending transversly to the motor vehicle and fixed in place. The roof arch pivot axis is spaced in the longitudinal direction of the motor vehicle from the pivot axis of the stretching bow. Furthermore, the stretching bow is connected via a movable coupling mechanism to the roof arch. The motor vehicle according to the present invention may particularly be a cabriolet and contain a wind deflector according to the present invention.

On the basis of the present invention, the stretching bow and the roof arch are not directly connected to one another, but rather via coupling kinematics, namely the movable coupling mechanism. This mechanism is particularly movable upon pivoting of stretching bow and roof arch so that at least parts of the coupling mechanism may move in relation to the stretching bow and the roof arch. The coupling of stretching bow and roof arch causes pivoting one of them to also result in pivoting of the other one, because it carries the other along.

A single drive may suffice to pivot the stretching bow and roof arch. It is thus especially simple to pivot the wind deflector between a neutral position, in which it essentially lies at the height of an equator of the motor vehicle and does not ensure any wind protection, and an active position, in which it has an essentially vertical orientation and ensures wind protection. Due to the separate and fixed mounting of stretching bow and roof arch, their shapes and dimensions may advantageously be implemented largely independently of one another. Furthermore, especially good stability and reliability of the configuration is provided. The stretching bow and the roof arch are particularly mounted to execute a rotating movement. The pivot axis of the stretching bow is advantageously situated in front of the pivot axis of the roof arch in the forward travel direction of the motor vehicle.

In one advantageous embodiment of the present invention, the coupling mechanism is connected to the stretching bow and the roof arch in lateral areas thereof. An especially compact configuration and a short travel path for pivoting stretching bow and roof arch may thus be achieved, to thus ensure a change between the active position and the neutral position of the wind deflector especially simply.

The coupling mechanism is preferably connected to both the stretching bow and also to the roof arch so it is rotatable. The coupling mechanism may thus be articulatingly mounted on the stretching bow and the roof arch. Such a connection may be implemented simply and reliably.

In a still further advantageous embodiment, the coupling mechanism is connected to the stretching bow and the roof arch in the manner of a four-bar mechanism that can be implemented compactly and cost-effectively. Furthermore, an intermediate gear between the stretching bow and the roof arch may be implemented simply, so that a specific transmission ratio may be set between the pivoting of the stretching bow and the pivoting of the roof arch.

In an especially preferred embodiment of the present invention, the coupling mechanism has a steering lever that is connected to the stretching bow and the roof arch. A pivot point, implemented as a connection point between the stretching bow and the steering lever, is spaced from a pivot point of the stretching bow implemented for pivotable mounting of the stretching bow; a pivot point, implemented as a connection point between the roof arch and the steering lever, is spaced from a pivot point of the roof arch implemented for pivotable mounting of the roof arch. This configuration may thus be implemented especially compactly. Furthermore, the steering lever is especially cost-effectively producible and mountable to ensure solid and reliable connection and pivoting.

The pivot point implemented for pivotable mounting of the roof arch is especially advantageously implemented as a drive point for attaching a drive for pivoting the wind deflector. Efficient pivoting of the wind deflector and rolling or unrolling of the flat structure are ensured by the engagement of the drive at this pivot point.

The coupling mechanism preferably has a first steering lever, a second steering lever, and a third steering lever that are connected to one another to be rotatable at a shared pivot point. The first steering lever is also rotatably connected to the stretching bow, and the second steering lever is rotatably connected to the roof arch. The third steering lever has a drive point for attaching a drive for pivoting the wind deflector. A four-bar mechanism is implemented by this configuration to make good control of the sequences between the stretching bow and the roof arch is made possible compactly and reliably. Furthermore, an intermediate gear for setting a transmission ratio between the pivot movement of the stretching bow and the pivot movement of the roof arch may thus be achieved especially efficiently.

The coupling mechanism is especially preferably situated and connected to the stretching bow and the roof arch in such a way that a transmission ratio of approximately 1:2 is established between pivoting of the stretching bow and pivoting of the roof arch. In its neutral position, the wind deflector, i.e., both the stretching bow and also the roof arch, lie essentially at the height of the equator of the motor vehicle. In the active position of the wind deflector, the stretching bow has an essentially vertical position, i.e., it is pivoted by approximately 90° in relation to the neutral position. In contrast, the roof arch has a horizontal position pivoted by approximately 180° in relation to the neutral position. The varying pivoting of stretching bow and roof arch may be achieved because of the transmission ratio of 1:2 implemented by the coupling mechanism.

In an advantageous embodiment of the present invention, the rolling axis for rolling and unrolling the flat structure is fixed in place in the motor vehicle, in particular in the vehicle's rear area. The roof arch is situated as a deflector element for deflecting the unrolled flat structure. Therefore, the flat structure attached to the stretching bow is unrolled from the roller axis upon pivoting of the wind deflector. The unrolled flat structure is deflected and tensioned by the roof arch. A part of the flat structure spans an active area that is used as a wind protector between the attachment of the flat structure to the stretching bow and to the roof arch used as the deflector element. This part of the flat structure advantageously runs largely vertically. Another part spans a cover area that may advantageously be used, for example, as a cover for a rear seat area of the motor vehicle or a convertible-top compartment of a cabriolet, between the roof arch used as the deflector element and the rolling axis. This other part of the flat structure advantageously runs largely horizontally.

In a still further advantageous embodiment, the rolling axis for rolling and unrolling the flat structure is implemented on the roof arch, in particular on a transverse web of the roof arch running parallel to its pivot axis. This allows an especially space-saving embodiment of the wind deflector.

In an especially preferred embodiment of the present invention, a further flat structure is fixedly attached fixed in place to the motor vehicle, in particular in the vehicle's rear area, and is rollable onto and unrollable from a rolling axis implemented on the roof arch. The flat structure thus spans an active area used as a wind protector in the active position of the wind deflector between the attachment of the flat structure to the stretching bow and the rolling axis implemented on the roof arch and assigned thereto. The flat structure advantageously runs largely vertically in this case. The further flat structure spans a cover area that may advantageously be used, for example, as a cover for a rear seat area of the motor vehicle or a convertible-top compartment of a cabriolet, between the rolling axis implemented on the roof arch and assigned thereto and the fixed attachment to the motor vehicle. The further flat structure advantageously runs largely horizontally in this case.

The two flat structures are preferably situated so that they are rollable onto and unrollable from the same rolling axis and are wound lying one on top of another on the rolling axis in their rolled states. This allows an especially compact embodiment of the wind deflector and the rolling and unrolling of the flat structures may be implemented using few components.

The flat structure especially preferably has a net-like material. It is especially flexible and may therefore be rolled and unrolled well. Furthermore, the material may thus be tensioned well by the pivoting of the roof arch, so that it offers especially efficient wind protection.

In one advantageous current embodiment of the present invention, the stretching bow and the roof arch are particularly pivotally mounted in diametrically opposite lateral areas of a vehicle body of the motor vehicle. An especially stable mounting is thus provided.

In yet a further advantageous current embodiment, lateral cover parts are implemented and situated in so that, in the active position of the wind deflector, they assume cover positions for essentially horizontal coverage of gaps present between the lateral areas of the motor vehicle and the unrolled flat structure. In this way, holes formed by the gaps between the lateral areas and the unrolled flat structure may be closed in a technically simple way, so that largely continuous coverage is ensured.

In a currently especially preferred embodiment of the present invention, lateral wind protection parts are implemented and situated so they are pivotable on the stretching bow so that, in the active position of the wind deflector, they span lateral active areas between lateral areas of the stretching bow and the unrolled flat structure ensuring the wind protection to generate additional wind protection. Holes between the lateral areas of the stretching bow and the unrolled flat structure may thus advantageously be closed in a technically simple way, so that a largely continuous active area. Thus especially good wind protection is ensured.

The stretching bow, the wind protection parts attached laterally thereto, and the roof arch are preferably implemented and situated such that the roof arch, when the wind deflector is pivoted into its active position, pivots the lateral wind protection parts so that they span the additional active areas. When the stretching bow is pivoted upward into its active position, the lateral wind protection parts also pivot. As the roof arch is pivoted, it may deflect the lateral wind protection parts inward so that they form the active area for the wind protection together with the unrolled and spanned flat structures.

The lateral cover parts and/or the lateral wind protection parts are preferably implemented and situated such that, in a neutral position of the wind deflector, when not used as a wind protector, they are concealed under a panel of the motor vehicle. The lateral cover parts and/or the lateral wind protection parts are thus well protected in their neutral position and housed in an especially space-saving way.

The coupling mechanism is especially preferably situated concealed under a motor vehicle panel. The coupling mechanism is thus protected from harmful external influences. In addition, a good appearance of the motor vehicle is thus ensured. The coupling mechanism is particularly attached below the equator of the motor vehicle.

Other objects, advantages and novel features of the present invention will become apparent from the following detailed description of the invention when considered in conjunction with the accompanying drawings.

DETAILED DESCRIPTION OF THE DRAWINGS

In the following description, identical reference numerals are used for identical or identically acting elements.

Figure 1A:
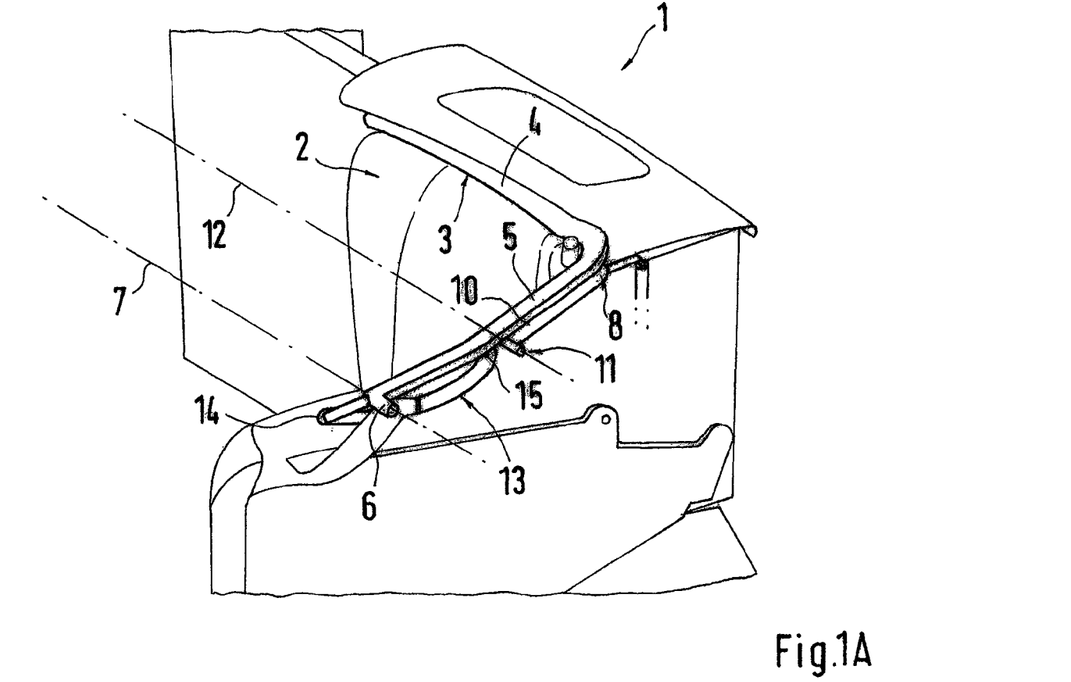
FIGS. 1A and 1B are schematic perspective views of an open, lateral area of a cabriolet having a coupling mechanism for a stretching bow and a roof arch of a wind deflector, according to the present invention.
Figure 1B:
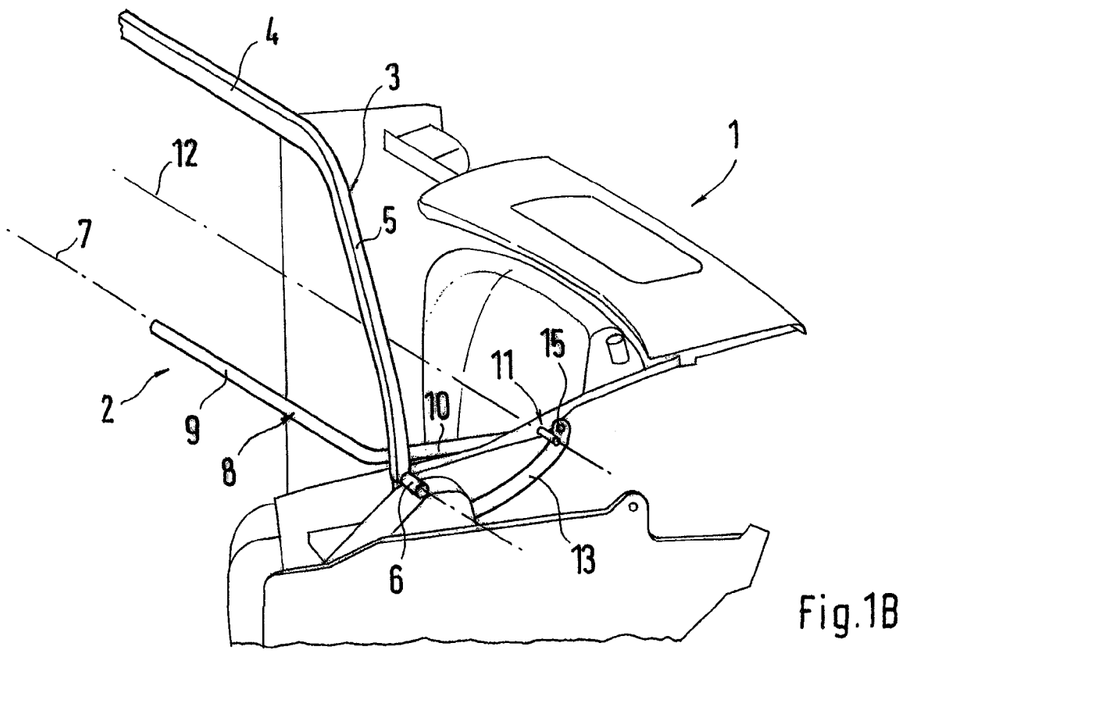

FIGS. 1A and 1B are schematic, perspective illustrations of a left lateral area of a cabriolet 1 that neighbors a rear seat area of the cabriolet 1. The lateral area of the cabriolet 1 is an area of a vehicle body of the cabriolet 1 shown here. A vehicle body panel is shown open in FIGS. 1A and 1B. The cabriolet 1 has a wind deflector 2 that is constructed in the transverse direction of the cabriolet 1 as essentially mirror-symmetric to an axis running through the vehicle's middle in the longitudinal direction. Therefore, for reasons of better visibility, only the left, lateral area of the cabriolet 1 and a left part of the wind deflector 2 are shown in FIGS. 1A and 1B.

The wind deflector 2 contains a stretching bow 3 containing two diametrically opposite and spaced lateral spars that are connected to one another, preferably in one piece, by a transverse web 4. FIGS. 1A and 1B show a left lateral spar 5 of the stretching bow 3. The stretching bow 3 is fixedly mounted in place and rotatable in diametrically opposite lateral areas of the vehicle body of the cabriolet 1 using pins extending in the transverse direction. FIGS. 1A and 1B show a pin 6 that is implemented on the left lateral spar 5 and extends outward therefrom. The stretching bow 3 is thus pivotally mounted on the vehicle body around a fixed pivot axis 7 that extends in the transverse direction and runs parallel to the transverse web 4 of the stretching bow 3.

The wind deflector 2 also contains a roof arch 8, illustrated as bow-shaped, having two diametrically opposite and spaced lateral spars that are connected to one another, preferably in one piece, by a transverse web 9. FIGS. 1A and 1B show a left lateral spar 10 of the roof arch 8. The roof arch 8 is fixedly mounted in place and rotatable in the diametrically opposite, lateral areas of the vehicle body of the cabriolet 1 using pins extending in the transverse direction. FIGS. 1A and 1B show a pin 11 on the left lateral spar 10 that extends outward therefrom.

The roof arch 8 is thus pivotally mounted on the vehicle body around a fixed pivot axis 12 extending in the transverse direction. The pivot axis 12 runs parallel to the transverse web 9 of the roof arch 8. The pivot axis 7 of the stretching bow 3 and the pivot axis 12 of the roof arch 8 are spaced from one another in the longitudinal direction of the cabriolet 1. In the present exemplary embodiment, the pivot axis 12 is implemented behind the pivot axis 7 in the forward travel direction of the cabriolet 1.

A coupling mechanism connects the stretching bow 3 and the roof arch 8 to one another. The coupling mechanism is a movable coupling mechanism that, in illustrated embodiment, has an oblong, slightly curved steering lever 13, one end of which is rotatably linked at a pivot point 14 to the stretching bow 3 and another end of which is rotatably linked at a pivot point 15 to the roof arch 8. The pivot point 14 is located on the lateral spar 5 of the stretching bow 3, in particular in an end area of the lateral spar 5 that is diametrically opposite the connection to the transverse web 4. The pivot point 15 is located on the lateral spar 10 of the roof arch 8, in particular in an end area of the lateral spar 10 that is diametrically opposite the connection to the transverse web 9.

The steering lever 13 is movable in relation to the stretching bow 3 and the roof arch 8, i.e., it changes its orientation in relation thereto during a pivot action. In the illustrated embodiment, the coupling mechanism and its linkage to the stretching bow 3 and the roof arch 8 are situated under the vehicle body panel of the cabriolet 1. In the mounted state, the coupling mechanism is therefore concealed by the vehicle body. This ensures a good appearance of the cabriolet 1 and protects the coupling mechanism from harmful external influences.

In the present illustrated embodiment, the coupling mechanism attached in the left, lateral area of the cabriolet 1 having the steering lever 13 is also correspondingly provided in a right, lateral area of the cabriolet 1. The pivot action thus becomes significantly more stable. However, it is unnecessary to situate the coupling mechanism on both sides. In principle, such a coupling on one side is sufficient to ensure pivoting of the wind deflector 2.

In FIG. 1A, the wind deflector 2 is illustrated in its neutral position in which it is laid down to the rear in the longitudinal direction of the cabriolet 1 and does not span an active area for protection from wind. The stretching bow 3 and the roof arch 8 are pivoted to the rear and lie essentially at the height of an equator of the cabriolet 1. The stretching bow 3 lies on the roof arch 8. The wind deflector 2 is shown in an active position in FIG. 1B, in which it spans an active area for protecting a passenger space of the cabriolet 1 from wind. The stretching bow 3 is pivoted upward by approximately 90° starting from the neutral position, so that its lateral spars extend nearly vertically upward. The roof arch 8 is pivoted forward by approximately 180° starting from the neutral position, so that it lies essentially at the height of the equator of the cabriolet 1 and its lateral spars run nearly horizontally. The transverse web 9 runs approximately below the transverse web 4.

To pivot the wind deflector 2 between its neutral position and its active position in the illustrated embodiment, the roof arch 8 is driven at its pins 11 using a drive so that a rotational movement is transmitted to the pins 11 that causes pivoting of the roof arch 8. The pivot movement of the roof arch 8 is transmitted to the steering lever 13 and therefrom to the stretching bow 3. It is also possible, however, to situate stretching bow 3, steering lever 13, and roof arch 8 so that the drive may occur via the stretching bow 3 or the steering lever 13. The stretching bow 3 and the roof arch 8 may advantageously be stored in their horizontal neutral position in a closed cassette and thereby protected from harmful external influences. The cassette preferably opens automatically when the wind deflector 2 is to be erected into its active position.

Figure 2:
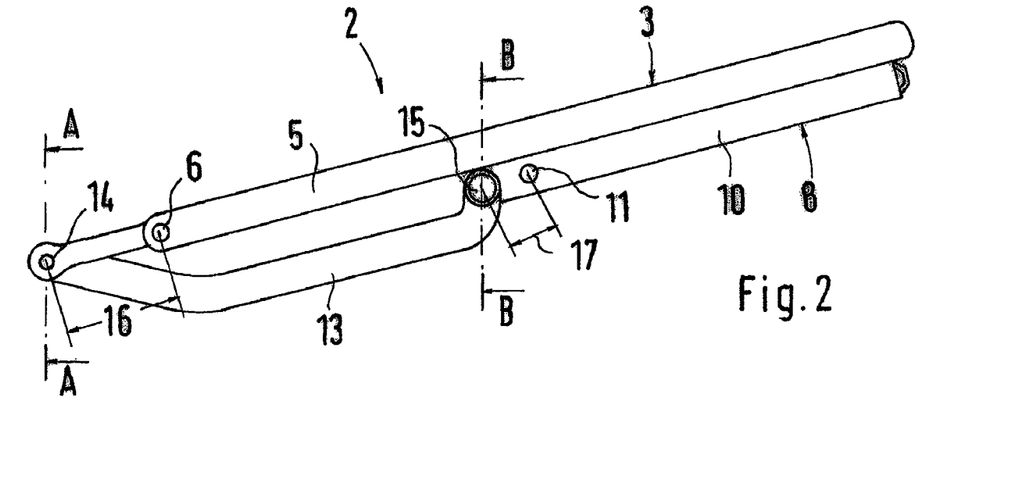
FIG. 2 is a schematic side view of a configuration of stretching bow, roof arch, and a coupling mechanism connecting the two for the wind deflector shown in FIG. 1.

FIG. 2 shows a side view of the configuration of stretching bow 3, roof arch 8, and the steering lever 13 connecting the bow 3 and arch 8 in the neutral position of the wind deflector 2 shown in FIG. 1A. Side views are shown of the lateral spar 5 that is articulatingly connected at the pivot point 14 to one end of the steering lever 13, and the lateral spar 10 that is articulatingly connected at the pivot point 15 to the other end of the steering lever 13. The roof arch 8 and the steering lever 13 are situated below the stretching bow 3. The pin 6 for the pivotable mounting of the stretching bow 3 and the pin 11 for the pivotable mounting of the roof arch 8 are also shown.

The pivot point 14 is provided in the axial extension to the pin 6 at the end of the stretching bow 3 and is mounted in front of the pin 6 in the forward travel direction in the neutral position of the wind deflector 2. The pivot point 14 has a specific distance 16 from the pin 6. The pivot point 15 is provided at the end of the roof arch 8 in the axial extension of the pin 11. The pivot point 15 is mounted in front of the pin 11 in the forward travel direction in the neutral position of the wind deflector 2. The pivot point 15 has a specific distance 17 from the pin 11.

In the illustrated embodiment, the distance 16 is greater than the distance 17. The two distances 16, 17 are dimensioned so that upon pivoting of the wind deflector 2, a transmission ratio of 1:2 is set between the stretching bow 3 and the roof arch 8. As a result, the roof arch 8 covers twice as long a path during pivoting as does the stretching bow 3. This ensures that the roof arch 8 covers an angle of approximately 180° upon pivoting of the wind deflector 2 between its neutral position and its active position, while the stretching bow 3 covers an angle of approximately 90°.

In the illustrated embodiment provided as an example of the present invention, the steering lever 13 has a shape curved slightly downward. Starting from its linkage in the pivot point 15 to the roof arch 8, the steering lever 13 first runs curved slightly downward for a short section so that a spacing results between the lateral spar 5 and the steering lever 13. Following this, the steering lever 13 then runs nearly parallel to the lateral spar 5 for a longer oblong section. Due to a slight bend upward, the curve of the steering lever 13 changes, so that it runs toward the pivot point 14 at which it is incident on the end of the stretching bow 3 and is rotatably attached thereto. Especially good transmission of the pivot movement between the roof arch 8 and the stretching bow 3 is achieved by the shape of the steering lever 13. The pin 11 implemented on the roof arch 8 is used for driving the roof arch 8 via a drive suitable for this purpose. For example, this may be a motorized drive having an electric motor or a hydraulic drive. The drive thus engages on the pivot axis 12 of the roof arch 8. A vertical section A-A in FIG. 2 through the pivot point 14 and a vertical section B-B in FIG. 2 through the pivot point 15 are shown in FIGS. 3A and 3B, respectively.

Figure 3A:
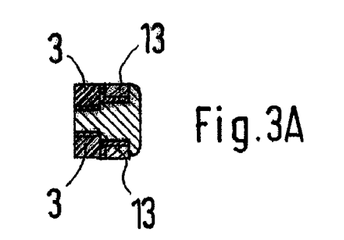
FIGS. 3A and 3B are sectional views of the coupling point of stretching bow and coupling mechanism and the coupling point of roof arch and coupling mechanism along lines A-A and B-B, respectively, of FIG. 2.
Figure 3B:
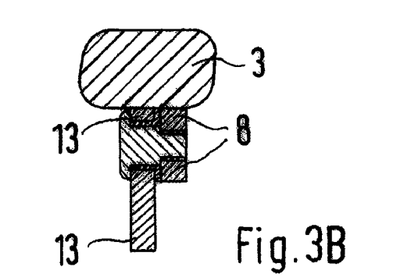

FIG. 3A shows the pivot point 14 as the connection point of stretching bow 3 and steering lever 13. FIG. 3B shows the pivot point 15 as the connection point of roof arch 8 and steering lever 13. The particular components may be decoupled from one another at the pivot points 14, 15 by decoupling sleeves.

Figure 4:
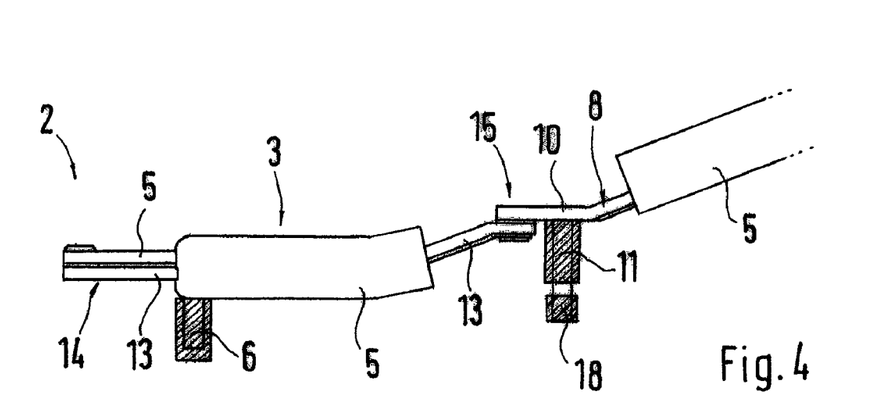
FIG. 4 is a schematic top view of the configuration shown in FIG. 2.

FIG. 4 shows the arrangement of FIG. 2 from the top. The upper stretching bow 3 is shown in section in a middle area, to allow illustration of the pin 11 located underneath the bow and the pivot point 15. A drive 18 is attached to the pin 11 and is used for pivoting the roof arch 8 and thus the entire wind deflector 2.

FIGS. 5A-5D are illustrations of the two lateral areas of the cabriolet 1 having the wind deflector 2. The stretching bow 3 and the roof arch 8 are shown in FIGS. 5A-5D in various pivot positions of the wind deflector 2. The steering lever 13 for connecting the stretching bow 3 and roof arch 8 is attached outside the vehicle body panel here. To span the active area for the wind protection, a forward front edge of a flexible flat structure is attached to the transverse web 4 of the stretching bow 3. The flat structure is formed by a net tarpaulin 19, i.e., a tarpaulin of net-like material. A rear front edge of the net tarpaulin 19 is attached to a rolling axis 20 running in the transverse direction for rolling and unrolling the net tarpaulin 19. The rolling axis 20 extends parallel to the pivot axes 7, 12 and is situated here in a rear area of the cabriolet 1 in an upper edge area of a rear seat area of the cabriolet 1 at the height of its equator. The rolling axis 20 is fixedly mounted in place and rotatable in the vehicle body of the cabriolet 1. The roof arch 8 is situated as a deflection element for deflecting the unrolled net tarpaulin 19. For this purpose, the net tarpaulin 19 is guided through below the transverse web 9 of the roof arch 8.

Figure 5A:
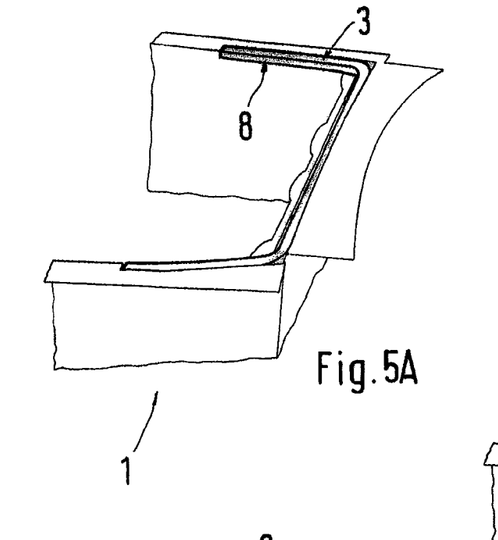
FIGS. 5A through 5D are schematic perspective views of stretching bow and roof arch in various pivot positions.
Figure 5B:
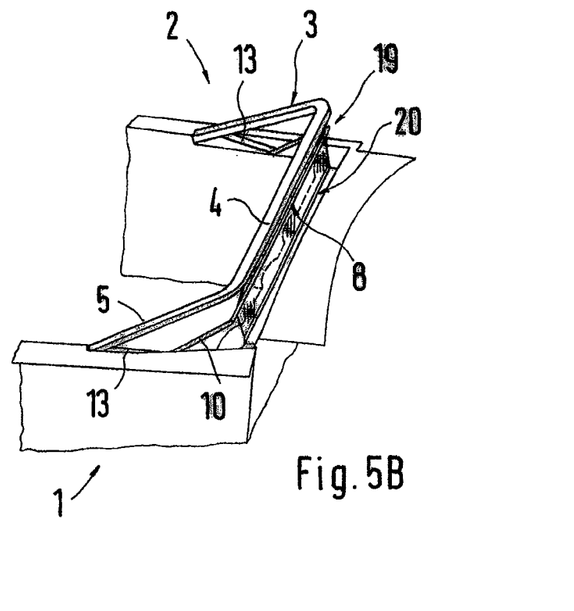
Figure 5C:
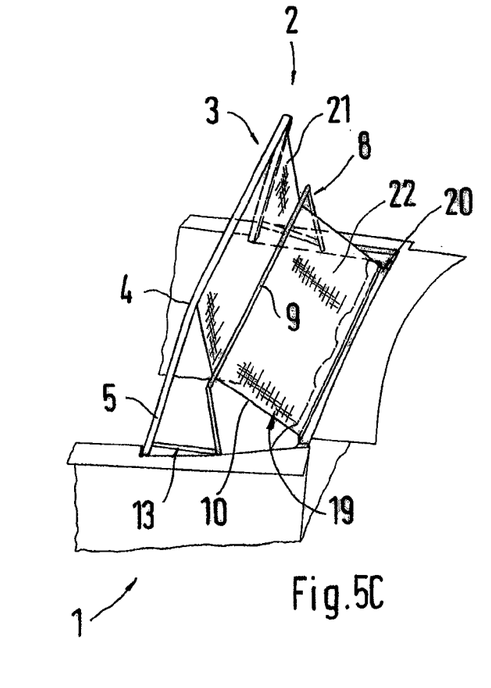

In FIG. 5A, the wind deflector 2 is located in its neutral position. The stretching bow 3 and the roof arch 8 are laid down to the rear at the height of the equator of the cabriolet 1. A situation shortly after the pivoting of the wind deflector 2 is shown in FIG. 5B. Both the stretching bow 3 and also the roof arch 8 are pivoted slightly upward from the neutral position. The net tarpaulin 19 is unrolled slightly from the rolling axis 20 by the pivot motion of the stretching bow 3.

Two partial active areas are spanned by the deflection of the unrolled net tarpaulin 19 by the roof arch 8. One partial active area 21 is spanned between the transverse web 9 of the roof arch 8 and the transverse web 4 of the stretching bow 3 and one partial active area 22 is spanned between the transverse web 9 of the roof arch 8 and the rolling axis 20. This may be seen more clearly in FIG. 5C, in which a situation is shown in which the wind deflector 2 has already been pivoted far and is located shortly before its active position. The two partial active areas 21 and 22 are already clearly implemented.

Figure 5D:
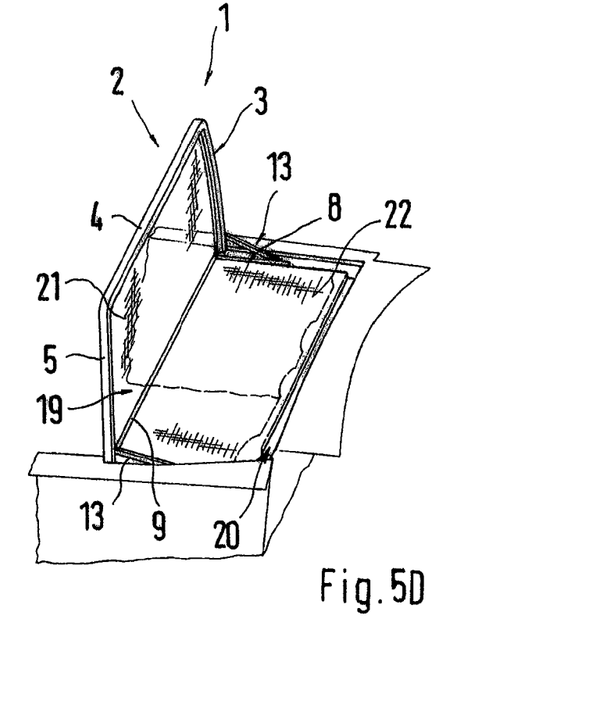

In FIG. 5D the wind deflector 2 is in its active position. The stretching bow 3 is pivoted essentially vertically upward and the roof arch 8 is pivoted nearly 180° forward, so that it again rests horizontally at the height of the equator of the cabriolet 1. The partial active area 21 ensures good wind protection and extends from the transverse web 4 up to the transverse web 9 to cover an area nearly completely spanned by the stretching bow 3 as a function of possible inclinations inward of the lateral spars of the stretching bow 3 and the width of the net tarpaulin 19 in the transverse direction. The active area 22 extends from the transverse web 9 located at the height of the equator of the cabriolet 1 up to the rolling axis 20. The partial active area 22 ensures coverage of a space lying underneath it. This space is the rear seat space of the cabriolet 1 as shown here.

Figure 6:
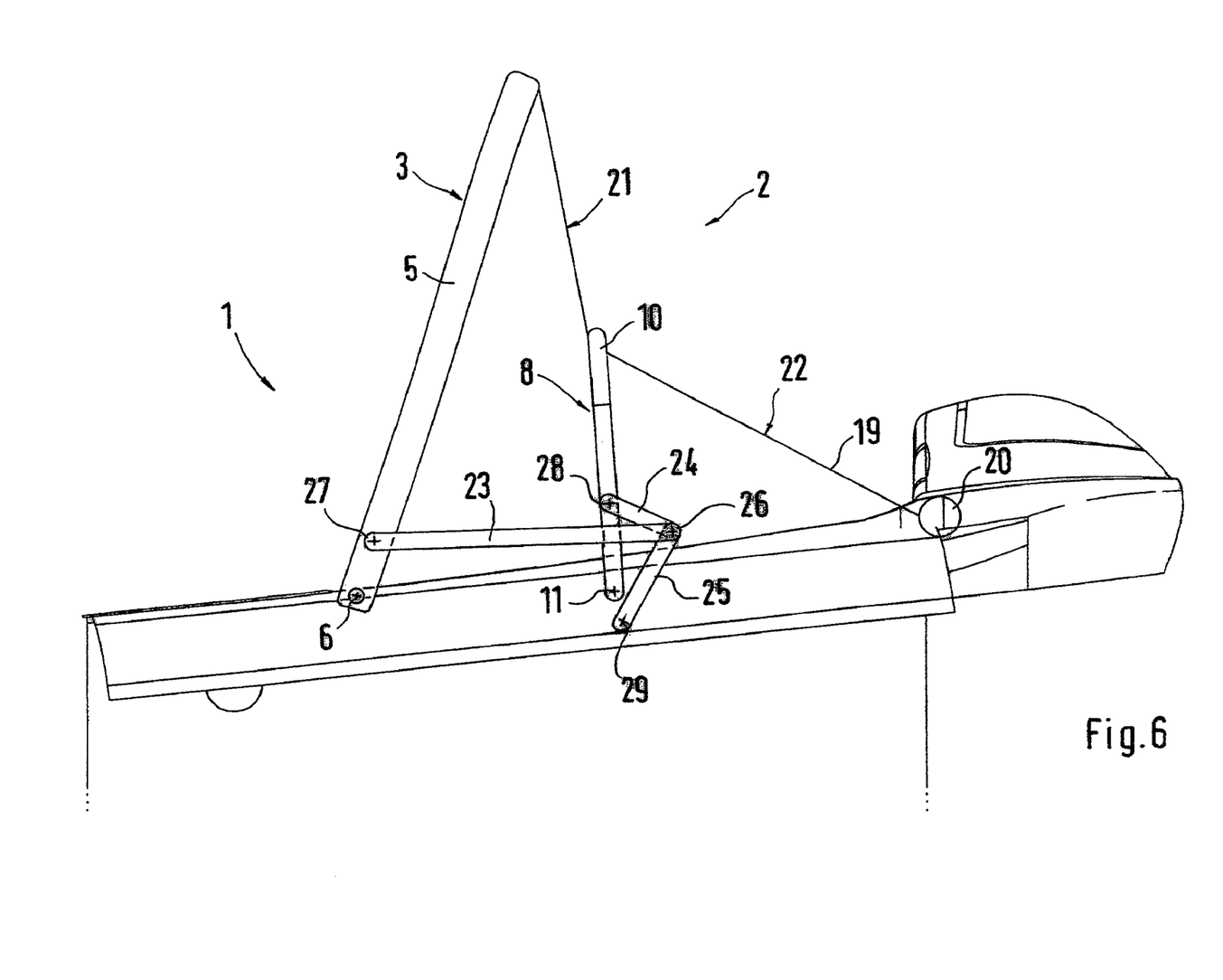
FIG. 6 is a schematic side view of a configuration of stretching bow, roof arch, and a further coupling mechanism connecting the two and having three levers.

FIG. 6 shows a schematic side view of a further embodiment of the wind deflector 2 pivoted between its neutral position and its active position. The stretching bow 3 and the roof arch 8 are connected to one another using a four-bar coupling mechanism having four pivots. This modified coupling mechanism also represents an intermediate gear for controlling the sequences between the stretching bow 3 and the roof arch 8, in particular during their pivoting.

The four-bar coupling mechanism has three oblong levers 23, 24, 25, that are each coupled to one another at one of their ends in a joint pivot point 26. The pivot point 26 is movable as it is not mounted on the cabriolet 1. Another end of the lever 23 is rotatably attached at a pivot point 27 to the lateral spar 5 of the stretching bow 3. The pivot point 27 is spaced from the pin 6, at which the stretching bow 3 is pivotally mounted on the vehicle body panel. Another end of the lever 24 is rotatably attached at a pivot point 28 to the lateral spar 10 of the roof arch 8. The pivot point 28 is spaced from the pin 11 on which the roof arch 8 is pivotally mounted on the vehicle body panel. Another end of the lever 25 is rotatably attached at a pivot point 29 to the vehicle body panel of the cabriolet 1.

The drive used for rotating the lever 25 is attached at the pivot point 29. The rotational movement of the lever 25 is transmitted via the shared pivot point 26 to the levers 23, 24 and via these, in turn, to the stretching bow 3 or the roof arch 8. In the embodiment of FIG. 6, the rolling axis 20 is also situated in the rear area of the cabriolet and the net tarpaulin 19 is attached to the transverse web 4 of the stretching bow 3. Therefore, the partial active areas 21 and 22 may be spanned and taken down by pivoting stretching bow 3 and roof arch 8.

The dimensions of the levers 23, 24, 25 and the configuration of the pivot points 27, 28 on the stretching bow 3 and on the roof arch 8 are selected so that the transmission ratio of 1:2 is set between the pivoting of the stretching bow 3 and that of the roof arch 8.

Figure 7:
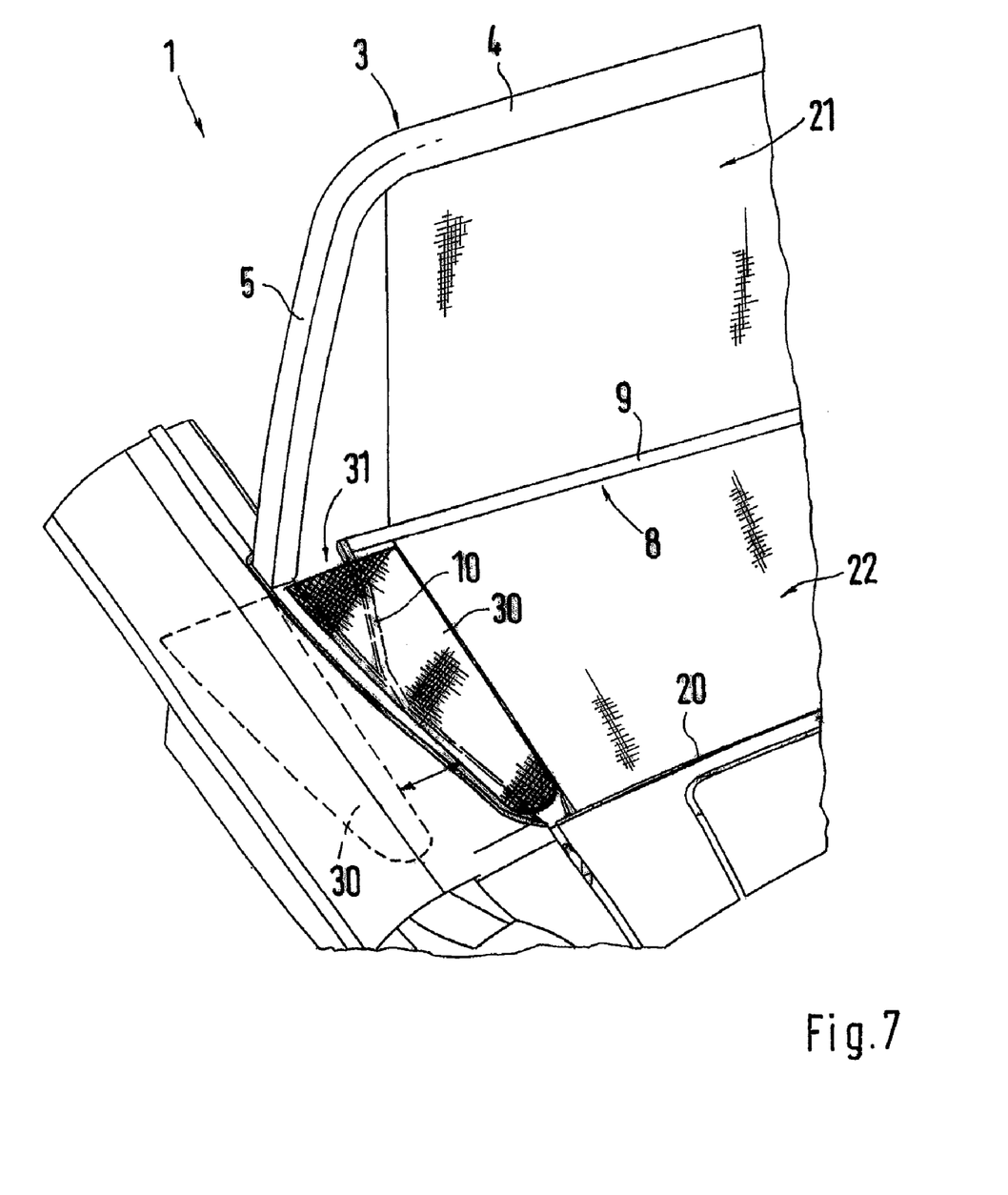
FIG. 7 is a schematic, perspective view of the wind deflector in its active position having a lateral cover flap for covering a gap existing between the lateral area of the cabriolet and an unrolled flat structure.

FIG. 7 shows the wind deflector 2 in its active position having a lateral cover flap 30 for covering a gap 31 existing between the left, lateral area of the cabriolet 1 and the unrolled net tarpaulin 19 spanning the partial active area 22. Due to the nonlinear shaping of the inner panel of the lateral area of the cabriolet 1 and the configuration of the left lateral outer edge of the net tarpaulin 19 spaced from the inner panel, the horizontal gap 31 is created is not otherwise covered by the spanned net tarpaulin 19. Coverage is provided by the additional cover flap 30 that covers the gap 31 after the wind deflector 2 is erected into its active position.

To cover the gap 31, a net-like material, in particular a material like the net tarpaulin 19, is spanned between a frame of the cover flap 30. In the neutral position of the wind deflector 2, the cover flap 30 is located in a neutral position concealed below the vehicle body panel as shown by dashed lines in FIG. 7. To move the cover flap 30 between its neutral position and an active position in which the gap 31 is covered, a specific drive mechanism is provided, for example, as a spring loaded drive by coupling the cover plate 30 to the drive for pivoting the wind deflector 2.

The drive mechanism can also be implemented by a control or movement of the stretching bow 3 and/or the roof arch 8. The cover flap 30 may, for example, be pushed or rotated out of the vehicle body panel. A further cover plate corresponding to the cover plate 30 is implemented on the right lateral area of the cabriolet 1, to cover a further gap that occurs in the active position of the wind deflector 2 between the inner panel of the right lateral area and a right lateral outer edge of the unrolled net tarpaulin 19.

Figure 8:
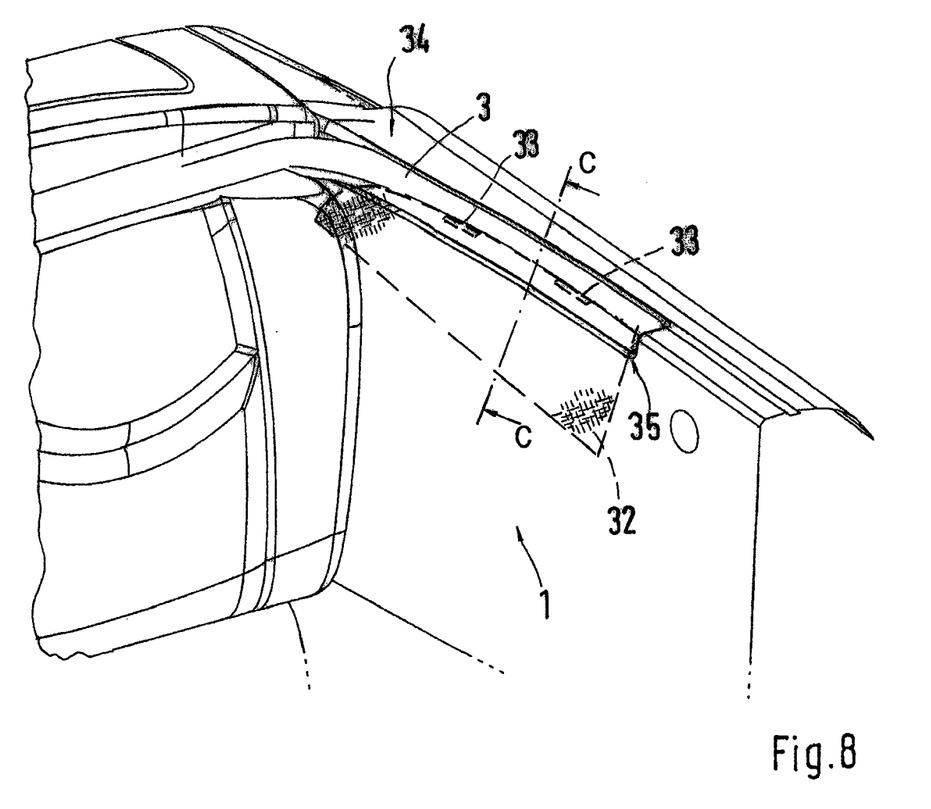
FIG. 8 is a schematic, perspective, partially sectional view of the wind deflector in its neutral position having a lateral wind protection part that is pivotably attached to the stretching bow and is concealed under a panel of the cabriolet.
Figure 9:
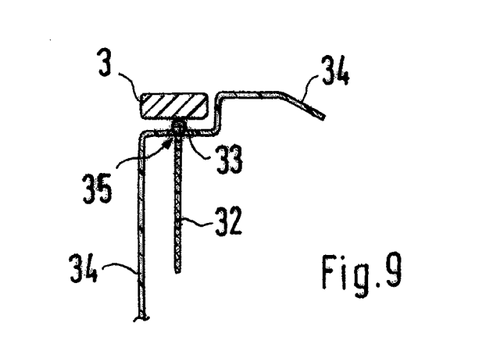
FIG. 9 is a schematic sectional view of the wind protection part and its mounting on the stretching bow as along line C-C in FIG. 8.

FIG. 8 shows the left lateral area of the cabriolet 1 having the wind deflector 2 in its neutral position. A lateral wind protection part 32 is attached so as to be pivotable using two hinges 33 to the lateral spar 5 of the stretching bow 3. The wind protection part 32 is used in the active position of the wind deflector 2 for ensuring additional wind protection between the lateral spar 5 of the stretching bow 3 and the unrolled net tarpaulin 19, that ensures the wind protection. In the neutral position of the wind deflector 2 shown in FIG. 8, the wind protection part 32 is concealed under panel 34 of the lateral area of the cabriolet 1. For this purpose, it is retracted nearly vertically into the panel 34. The wind protection part 32 is thus not visible from the outside, because a gap 35 provided for the insertion of the wind protection part 32 into the panel 34 is covered on top by the stretching bow 3. A section C-C through a part of the right lateral area of the cabriolet 1 shown in FIG. 8 is illustrated in FIG. 9. The wind protection part 32 is retracted vertically through the gap 35 into the vehicle body panel 34. One of the hinges 33 used for linking the wind protection part 32 to the stretching bow 3 is also shown.

Figure 10:
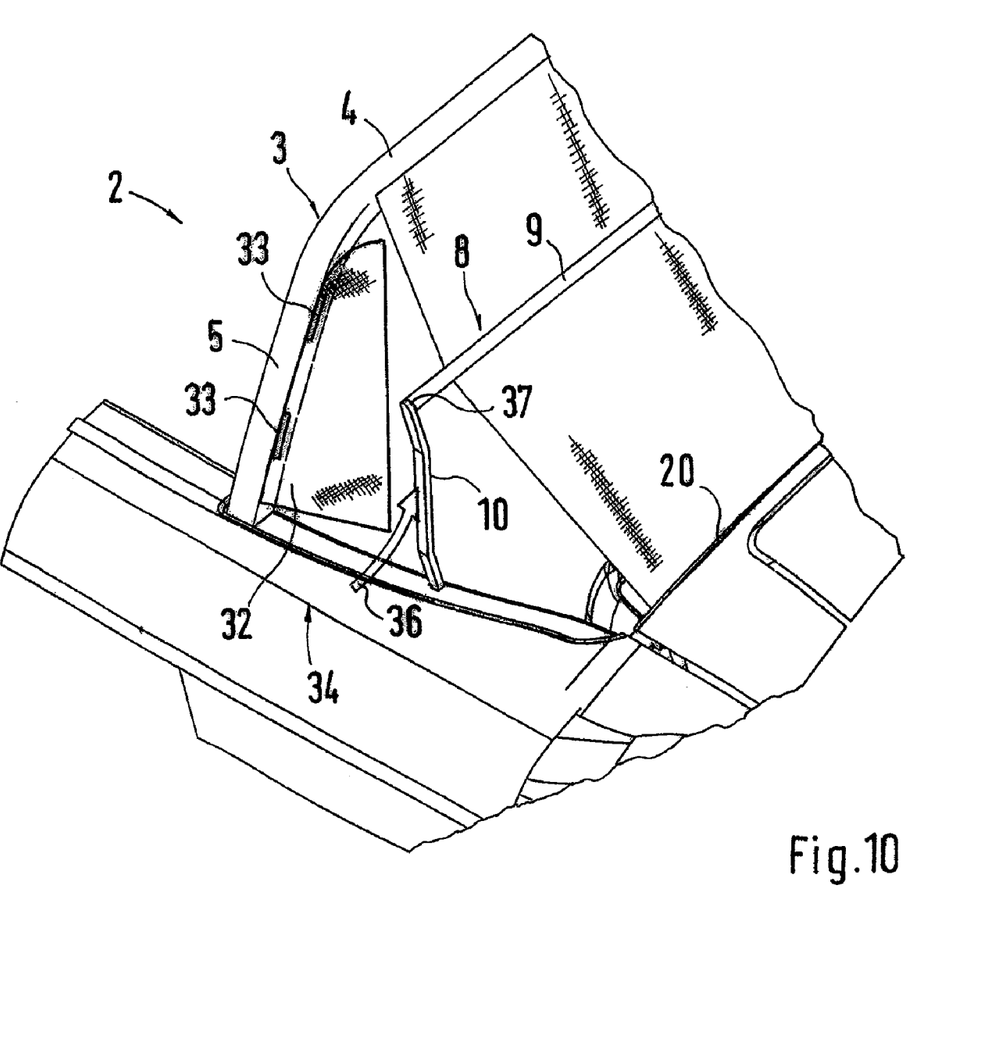
FIG. 10 is a schematic, perspective view of the wind deflector from FIG. 8 as it is pivoted.

FIG. 10 shows the wind deflector 2 of FIG. 8 as it is pivoted in the direction of arrow 36 which represents the pivoting of the stretching bow 3 and the roof arch 8 upwardly. Upon pivoting of the stretching bow 3 upwardly, the wind protection part 32 previously retracted into the panel 34 is also now pulled out of the panel 34. As soon as it has completely left the interior of the panel 34, the wind protection part 32 folds inwardly and is engaged by the pivoting of the roof arch 8 by a corner 37 at the transition from the lateral spar 10 to the transverse web 9 on the roof arch 8. The transition is used as a lift crank, and its pivot movement is controlled by the corner 37 so that the wind protection part 32 is pressed nearly 90° forward by the pivoting action of the roof arch 8 as illustrated in FIG. 11, in which the wind deflector 2 is in its active position.

Figure 11:
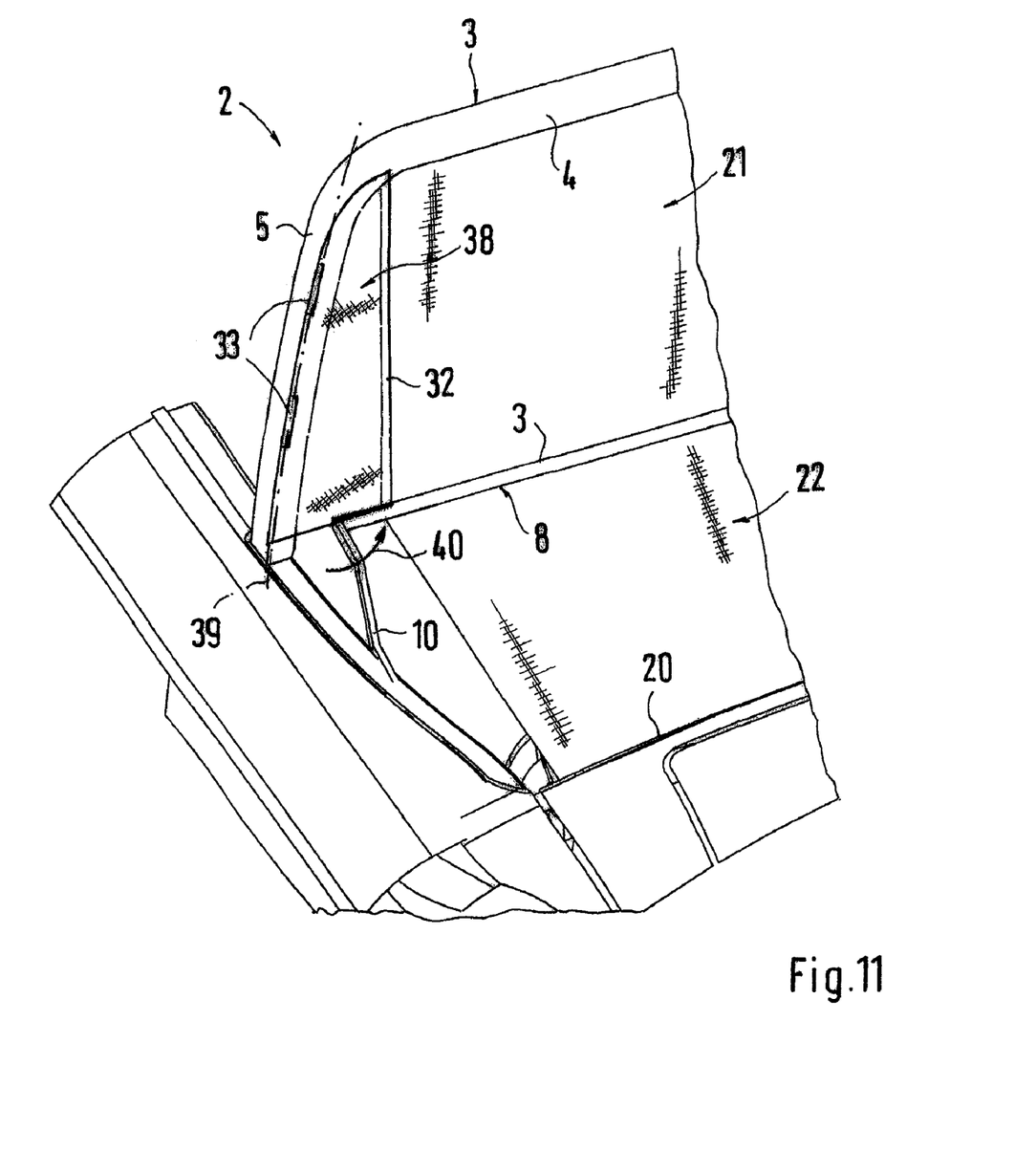
FIG. 11 is a schematic, perspective view of the wind deflector from FIG. 8 in its active position.

In addition to the partial active area 21 spanned by the unrolled net tarpaulin 19, a lateral active area 38 is spanned by the wind protection part 32 to generate an additional wind protection for the passenger space, as seen in FIG. 11. For this purpose, starting from its neutral position, the wind protection part 32 has been pivoted by approximately 90° around a pivot axis 39 into an active position, so as to span the active area as additional wind protection. This pivoting of the wind protection part 32 is represented in FIG. 11 by an arrow 40.

To generate the active area 38, a net-like material, in particular a material like the net tarpaulin 19, is spanned between a frame of the wind protection part 32. Corresponding to the wind protection part 32 described on the basis of FIGS. 8-11, in the illustrated embodiment, a further wind protection part is implemented on the right lateral spar of the stretching bow 3, to form a further additional lateral active area for additional wind protection between the right lateral spar and the partial active area 21 spanned by the net tarpaulin 19.

Figure 12:
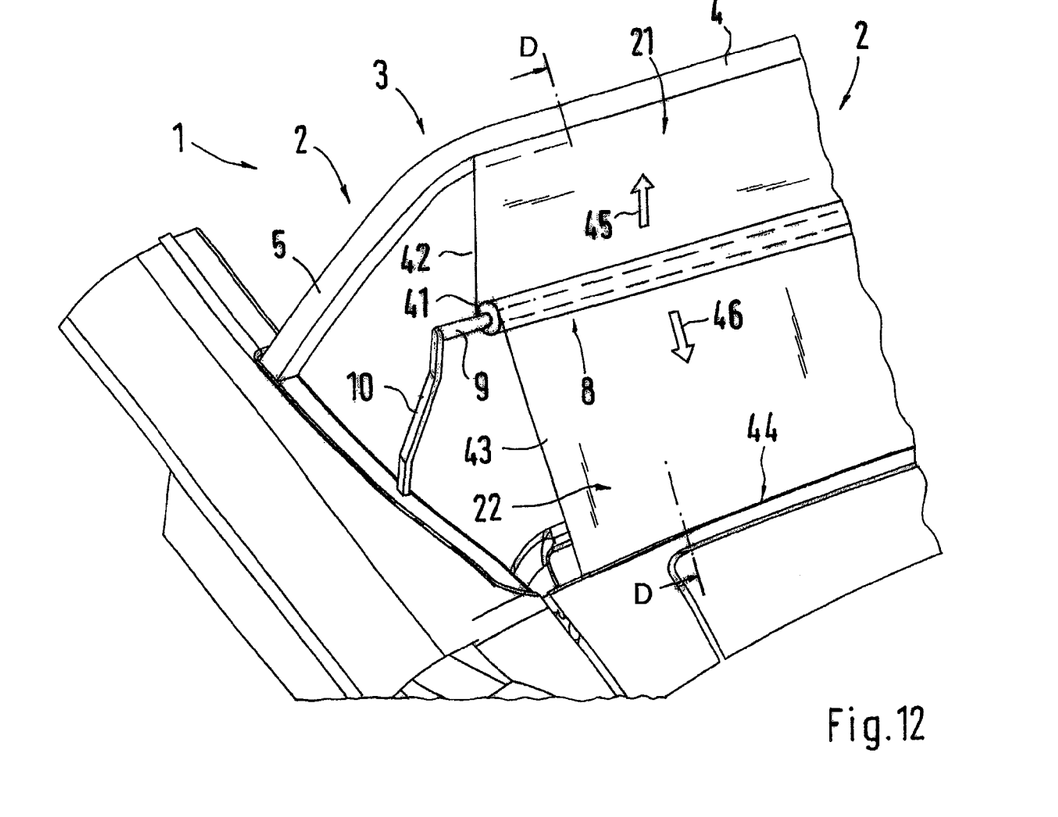
FIG. 12 is a schematic, perspective view of another exemplary embodiment of a wind deflector having a rolling axis situated on the roof arch.

FIG. 12 shows an embodiment of the wind protector 2 having a rotatable rolling axis 41 implemented on the transverse web 9 of the roof arch 8. Front ends of two net tarpaulins 42 and 43 are attached to the rolling axis 41. Another front end of the net tarpaulin 42 is attached to the transverse web 4 of the stretching bow 3 and another front end of the net tarpaulin 43 is attached to a vehicle body panel 44, in particular in the rear area of the cabriolet 1.

In a rolled state, the two net tarpaulins 42, 43 are wound lying one on top of another on the rolling axis 41. The rolling axis 41 rotates due to the pivoting of the stretching bow 3 and the roof arch 8, and the net tarpaulins 42, 43 unroll in different directions from the rolling axis 41. The net tarpaulin 42 spans the partial active area 21 in its active position upon pivoting of the wind deflector 2. This is indicated in FIG. 12 by an arrow 45. The net tarpaulin 43 simultaneously spans the partial active area 22. This is indicated in FIG. 12 by an arrow 46.

Figure 13:
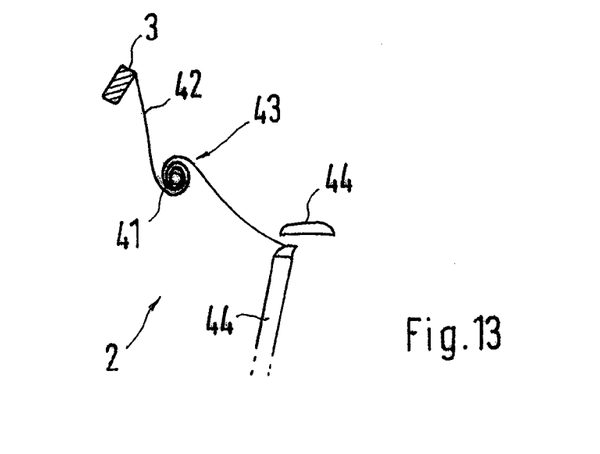
FIG. 13 is a schematic sectional view of the wind deflector along line D-D of FIG. 12.

A section D-D through the wind deflector 2 shown in FIG. 12 is illustrated in FIG. 13. There the double winding of the two net tarpaulins 42, 43 on the transverse web 9 of the roof arch 8 implemented as the rolling axis 41 is shown. The net tarpaulin 42 is additionally attached to the transverse web 4 of the stretching bow 3, and the net tarpaulin 43 is additionally attached to the vehicle body panel 44. The two net tarpaulins 42, 43 are thus automatically unrolled from the rolling axis 41 upon pivoting of the wind deflector 2. The rolling procedure for rolling the unrolled net tarpaulins 42, 43 occurs in reverse. The two net tarpaulins 42, 43 are again rolled onto the rolling axis 41 lying one on top of another.

In the exemplary embodiment described on the basis of FIGS. 12 and 13, the net tarpaulins 42, 43 are wound lying one on top of another on a shared rolling axis 41. A separate rolling axis can also be provided for each of the two net tarpaulins 42, 43 on the transverse web 9 of the roof arch.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A wind deflector for a motor vehicle, comprising a stretching bow pivotally mounted around a first fixed pivot axis extending in a transverse direction of the motor vehicle, a flexible flat structure operatively attached to the stretching bow so as to be rollable onto and unrollable from a rolling axis extending parallel to the first pivot axis, and a roof arch operatively connected to the stretching bow, wherein the roof arch is pivotally mounted around a second fixed pivot axis extending in the transverse direction of the motor vehicle and spaced in a longitudinal direction of the motor vehicle from the first fixed pivot axis, and the stretching bow is operatively connected to the roof arch via a movable coupling mechanism.

2. The wind deflector according to claim 1, wherein the coupling mechanism is operatively connected to the stretching bow and to the roof arch in lateral areas thereof.

3. The wind deflector according to claim 1, wherein the coupling mechanism is rotatably connected both to the stretching bow and the roof arch.

4. The wind deflector according to claim 3, wherein the coupling mechanism a four-bar mechanism.

5. The wind deflector according to claim 3, wherein the coupling mechanism comprises a steering lever operatively connected to the stretching bow and to the roof arch and a first pivot point acting as a connection point between the stretching bow and the steering lever is spaced from a second pivot point of the stretching bow for pivotable mounting of the stretching bow, and a third pivot point acting as a connection point between the roof arch and the steering lever, is spaced from a fourth pivot point of the roof arch for pivotable mounting of the roof arch.

6. The wind deflector according to claim 5, wherein the fourth pivot point is configured to act as a drive point for operatively connecting a drive to pivot the wind deflector.

7. The wind deflector according to claim 3, wherein the coupling mechanism comprises a first steering lever, a second steering lever, and a third steering lever that are rotatably connected to one another in a joint pivot point, the first steering lever also being connected to the stretching bow, the second steering lever being rotatably connected to the roof arch, and the third steering lever having a drive point for connecting a drive to pivot the wind deflector.

8. The wind deflector according to claim 1, wherein the coupling mechanism is operatively connected to the stretching bow and the roof arch so that a transmission ratio of approximately 1:2 is established between pivoting of the stretching bow and pivoting of the roof arch.

9. The wind deflector according to claim 1, wherein the rolling axis for rolling and unrolling the flexible flat structure is fixed in place in the motor vehicle and the roof arch is situated to act as a deflection element for deflecting the unrolled flat structure.

10. The wind deflector according claim 1, wherein the rolling axis is arranged on a transverse web of the roof arch extending parallel to the second fixed pivot axis.

11. The wind deflector according to claim 10, wherein a further flexible flat structure is fixedly attached in place at the motor vehicle and is rollable and unrollable around the rolling axis arranged on the roof arch.

12. The wind deflector according to claim 11, wherein the flat structures are situated to be rollable and unrollable around a common rolling axis and, in their rolled states, are wound lying one on top of another on the common rolling axis.

13. The wind deflector according to claim 1, wherein the flexible flat structure comprises a net-like material.

14. The wind deflector according to claim 1, wherein the stretching bow and the roof arch are mounted so as to be pivotable in diametrically opposite, lateral areas of a vehicle body of the motor vehicle.

15. The wind deflector according to claim 14, wherein lateral cover parts are provided so that, in an active position of the wind deflector in which it is used for wind protection, the lateral cover parts assume cover positions for essentially horizontal coverage of gaps between the lateral areas of the motor vehicle and the unrolled flat structure.

16. The wind deflector according to claim 1, wherein lateral wind protection parts are provided, so as to be pivotable on the stretching bow such that, in the active position of the wind deflector in which it is used for wind protection, the lateral cover parts span lateral active areas between lateral areas of the stretching bow and the unrolled flat structure to generate additional wind protection.

17. The wind deflector according to claim 16, wherein the stretching bow, the lateral wind protection parts operatively attached thereto, and the roof arch are so configured and arranged that the roof arch, upon pivoting of the wind deflector into its active position, pivots the lateral wind protection parts to span the lateral active areas.

18. The wind deflector according to claim 14, wherein at least one of the lateral cover parts and the lateral wind protection parts are operatively arranged so as to be concealable under a panel of the motor vehicle in a neutral position of the wind deflector when not used as for wind protection.

19. The wind deflector according claim 1, wherein the coupling mechanism is concealable under a panel of the motor vehicle.

20. A motor vehicle, including a cabriolet, having a wind deflector according to claim 1.

* * * * *